United States Patent
Pott

(10) Patent No.: US 6,637,190 B1
(45) Date of Patent: Oct. 28, 2003

(54) METHOD FOR DESULPHURATING A NOX-STORAGE CATALYST THAT IS ARRANGED IN AN EXHAUST CHANNEL OF A COMBUSTION ENGINE

(75) Inventor: Ekkehard Pott, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 10/031,657

(22) PCT Filed: Apr. 20, 2000

(86) PCT No.: PCT/EP00/03582

§ 371 (c)(1),
(2), (4) Date: Nov. 28, 2001

(87) PCT Pub. No.: WO00/70201

PCT Pub. Date: Nov. 23, 2000

(30) Foreign Application Priority Data

May 12, 1999 (DE) .......................... 199 21 973

(51) Int. Cl.⁷ .................................................. F01N 3/00
(52) U.S. Cl. .............................. 60/274; 60/276; 60/285
(58) Field of Search .......................... 60/274, 276, 277, 60/285, 286, 301; 73/118.1

(56) References Cited

U.S. PATENT DOCUMENTS

| 5,402,641 A | * | 4/1995 | Katoh et al. ................... 60/285 |
| 5,437,153 A | * | 8/1995 | Takeshima et al. ........... 60/285 |
| 5,771,685 A | * | 6/1998 | Hepburn ....................... 60/277 |
| 5,983,627 A | * | 11/1999 | Asik ............................. 60/274 |
| 6,134,883 A | * | 10/2000 | Kato et al. .................... 60/274 |
| 6,161,377 A | * | 12/2000 | Boegner et al. ............... 60/285 |
| 6,167,695 B1 | * | 1/2001 | Itou et al. ..................... 60/276 |
| 6,263,666 B1 | * | 7/2001 | Kubo et al. ................... 60/277 |
| 6,305,160 B1 | * | 10/2001 | Hammerle et al. ........... 60/274 |
| 6,308,515 B1 | * | 10/2001 | Bidner et al. ................. 60/285 |

* cited by examiner

Primary Examiner—Thomas Denion
Assistant Examiner—Tu M. Nguyen
(74) Attorney, Agent, or Firm—Norris McLaughlin & Marcus

(57) ABSTRACT

A process for desulfurizing at least one $NO_x$ storage catalytic converter, which is arranged in an exhaust pipe of an internal-combustion engine, includes setting a minimum desulfurization temperature at the $NO_x$ storage catalytic converter and an operating mode of the internal-combustion engine with lambda $\leq 1$, and at least temporarily influencing one operating parameter of the internal-combustion engine. Desulfurization is initiated as a function of a ratio of the $NO_x$ concentration upstream and downstream of the $NO_x$ storage catalytic converter as a function of an $NO_x$ mass incorporated in the $NO_x$ storage catalytic converter (degree of sulfurization) and as a function of at least one of a current temperature of the $NO_x$ storage catalytic converter and a current lambda value.

5 Claims, 2 Drawing Sheets

Figure 1:
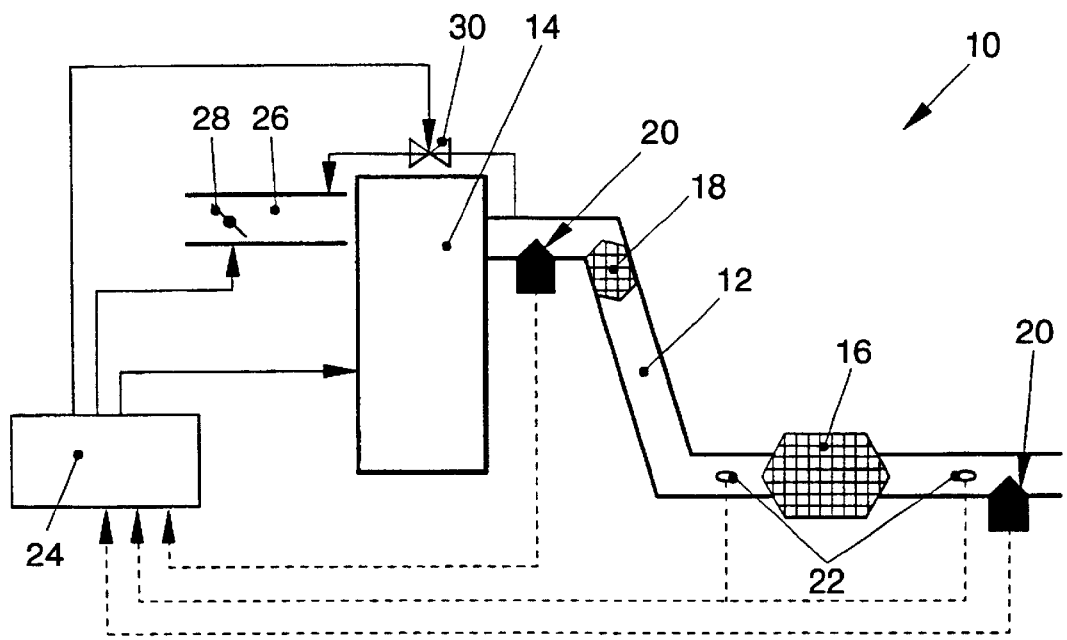

METHOD FOR DESULPHURATING A NOX-STORAGE CATALYST THAT IS ARRANGED IN AN EXHAUST CHANNEL OF A COMBUSTION ENGINE

The invention relates to a process for the desulfurization of at least one $NO_x$ storage catalytic converter which is arranged in an exhaust pipe of an internal-combustion engine, having the features listed in the preamble of claim 1.

Processes for the desulfurization of $NO_x$ storage catalytic converters are known. In these processes, during the desulfurization what are known as regeneration parameters, such as a minimum temperature at the $NO_x$ storage catalytic converter and an operating mode of the internal-combustion engine with $\lambda \leq 1$, have to be set.

When the operating mode of the internal-combustion engine involves $\lambda < 1$, a concentration of reducing gas components, such as CO, HC or $H_2$, predominates in the exhaust gas over a concentration of oxygen (rich atmosphere). At $\lambda > 1$, the oxygen concentration is dominant (lean-burn atmosphere). While the internal-combustion engine is operating in a lean-burn atmosphere, $SO_2$ is formed as well as $NO_x$, on account of fluctuating levels of sulfur in the fuel mix being burned. Like the $NO_x$, this $SO_2$, in a lean-burn atmosphere, is absorbed by the $NO_x$ storage catalytic converter; the absorption of $SO_2$ may lead to the formation of local inhomogeneities as a result of the formation of sulfate grains. This process leads to a reduction in a catalytically active surface region and in a capacity of the $NO_x$ storage catalytic converter and offers a point of attack for corrosive processes which cause permanent damage to the $NO_x$ storage catalytic converter.

It is known to measure a degree of sulfurization of the $NO_x$ storage catalytic converter on the basis of recording an efficiency with regard to a reduction of $NO_x$ (conversion reaction). For example, DE 197 47 222 C1 describes establishing an $NO_x$ storage capacity which has been reduced by sulfur poisoning by recording the $NO_x$ concentration, which rises relatively rapidly downstream of the $NO_x$ storage catalytic converter, in lean-burn phases.

If the degree of sulfurization reaches a threshold value, it is also known to initiate the desulfurization by at least temporarily influencing an operating parameter of the internal-combustion engine (measure). These measures comprise, for example, late ignition, reinjection before or during a combustion operation or a cylinder-selective trimming of the internal-combustion engine, and therefore lead to an increased fuel consumption. These measures are often taken in order to increase an exhaust-gas temperature upstream of the $NO_x$ storage catalytic converter and then to reach the minimum temperature at the $NO_x$ storage catalytic converter. A drawback of the known processes is that the desulfurization is initiated only on the basis of the efficiency of the conversion reaction, i.e. after the threshold value has been reached, and therefore relatively favorable operating states of the internal-combustion engine which occur in practice and in which the threshold value has not been reached, yet the temperature of the $NO_x$ storage catalytic converter is close to the minimum temperature, remain unused. This leads to an increased fuel consumption.

The invention is based on the object of making the desulfurization of the $NO_x$ storage catalytic converter significantly more dynamic, i.e. of including not just the degree of sulfurization of the catalytic converter but also the regeneration parameters in order to assess the need for desulfurization.

This object is achieved by the process for the desulfurization of at least one $NO_x$ storage catalytic converter arranged in the exhaust pipe of an internal-combustion engine by the features given in claim 1. The fact that the desulfurization is initiated, not only by the degree of sulfurization, but also as a function of a current lambda value and/or a current temperature of the $NO_x$ storage catalytic converter means that the desulfurization can be carried out significantly more efficiently, i.e. so that more fuel is saved. Furthermore, it is advantageous that it is possible to maintain a smaller size of the sulfate grains formed by the desulfurization, since overall the desulfurization takes place more frequently.

In a preferred configuration of the process, a characteristic variable which is formed from the degree of sulfurization, the lambda value and the $NO_x$ storage catalytic converter temperature is determined in order to assess the need for desulfurization. The characteristic variable lies within a characteristic diagram which can be characterized by means of a ratio of a load to a rotational speed of the internal-combustion engine. This characteristic diagram can be divided into any desired number of regions in which, for example, the threshold value for the desulfurization is reduced as the temperature rises. In this way, it is possible to react very dynamically to given operating states with regard to initiating the desulfurization.

Further preferred configurations of the invention will emerge from the remaining features listed in the subclaims.

Figure 2:
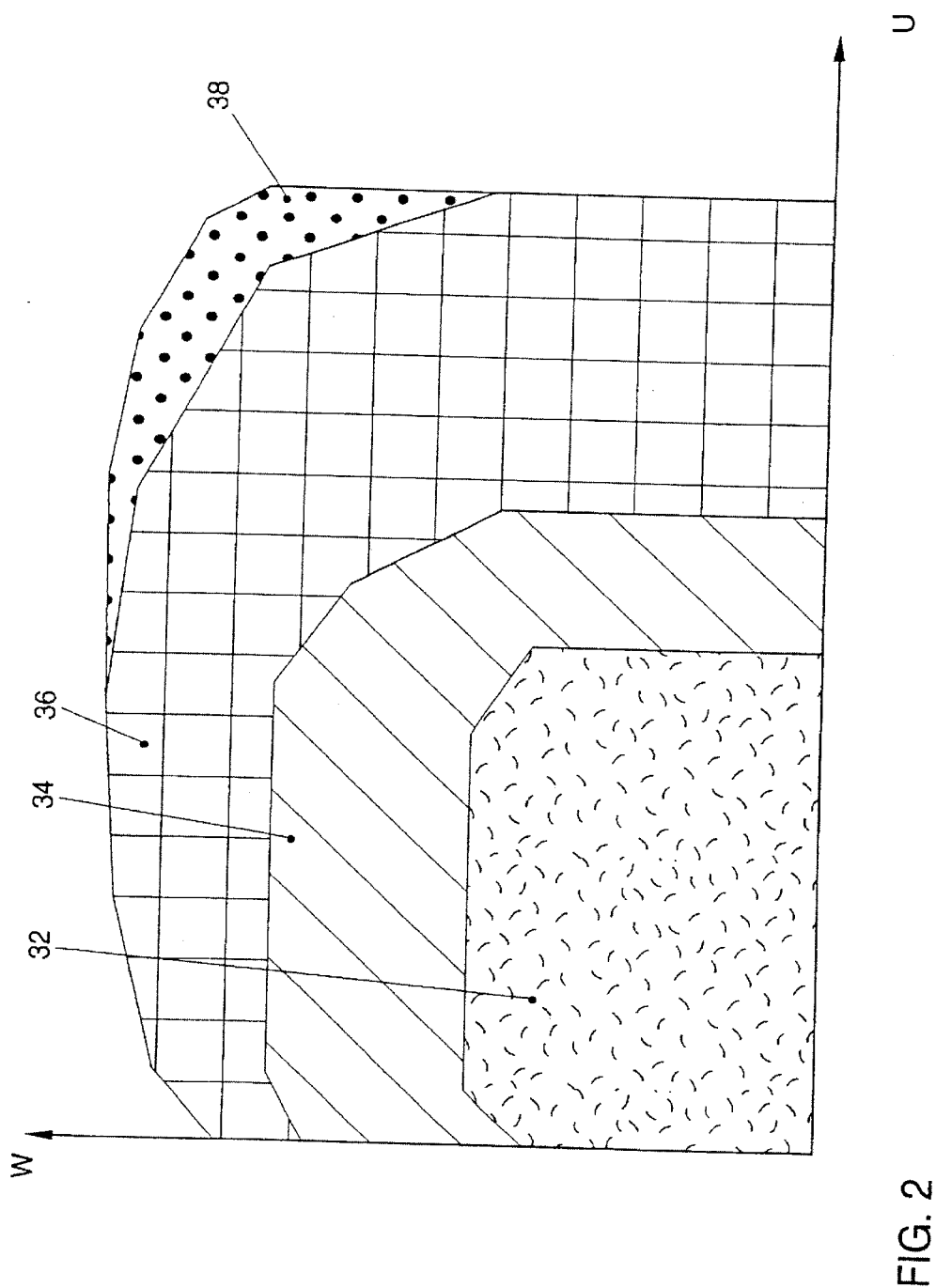

The invention is explained in more detail below in an exemplary embodiment with reference to the associated drawings, in which:

FIG. 1 shows an arrangement of a catalytic converter system in an exhaust pipe of an internal-combustion engine, and FIG. 2 shows a ratio of a load to a rotational speed of an internal-combustion engine.

FIG. 1 diagrammatically depicts an arrangement of a catalytic converter system 10 in an exhaust pipe 12 of an internal-combustion engine 14. The catalytic converter system 10 comprises an $NO_x$ storage catalytic converter 16 and a preliminary catalytic converter 18, as well as suitable gas sensors 20 and temperature sensors 22.

An operating mode of the internal-combustion engine 14 can be regulated by means of an engine management system 24. If, for example, an operating mode with $\lambda < 1$ (rich-burn atmosphere) is desired, an oxygen concentration in an induction pipe 26 upstream of a combustion stage of a fuel-air mix has to be reduced. As a result, the levels of reducing gas components in the exhaust gas increase compared to a level of oxygen. By way of example, an operating mode of this type can be achieved by reducing a volumetric flow rate of intake air by means of a throttle valve 28 and at the same time supplying low-oxygen exhaust gas via an exhaust return valve 30.

In an operating mode with $\lambda > 1$ (lean-burn atmosphere), as well as $NO_x$, $SO_2$ is also absorbed in the $NO_x$ storage catalytic converter 16, while the small quantities of reducing gas components are almost completely converted in the preliminary catalytic converter 18. Depending on a capacity and a desorption temperature of the $NO_x$ storage catalytic converter 16, the internal-combustion engine 14 has to be operated with $\lambda \leq 1$ for regeneration purposes. In an operating mode of this type, the $NO_x$ which has previously been absorbed on a catalytically active surface of the $NO_x$ storage catalytic converter 16 is reduced.

$SO_2$ which has also been absorbed is incorporated in the $NO_x$ storage catalytic converter 16 in the form of sulfate, but reversing this incorporation process requires significantly higher temperatures than those required in order to reverse the incorporation of $NO_x$. Therefore, a minimum desulfurization temperature and a lambda value of $\leq 1$ (regeneration parameters) have to prevail in order for desulfurization to be carried out.

A need for desulfurization results from the efficiency of a conversion reaction of the $NO_x$ storage catalytic converter 16, and a current temperature of the $NO_x$ storage catalytic converter 16 and/or a current lambda value. The efficiency can be recorded with the aid of the gas sensor 20, which measures an $NO_x$ concentration downstream of the $NO_x$ storage catalytic converter 16. In this way, it is easy to determine a degree of sulfurization and therefore the efficiency on the basis of values gained from experience or by measuring the $NO_x$ concentration upstream of the $NO_x$ storage catalytic converter 16. The current temperature at the $NO_x$ storage catalytic converter 16 can be determined using the temperature sensors 22, while the current lambda value can once again be determined using the gas sensors 20. Therefore, at any time a degree of sulfurization, a temperature and a lambda value are known, and these in combination are used as a characteristic variable for assessing the need for desulfurization.

FIG. 2 shows a position of the characteristic variable as a function of a load W at a rotational speed U of the internal-combustion engine 14. If, for example at constant load W, the rotational speed U is increased, this leads to increased fuel consumption, with the result that the lambda value falls and the temperature of the exhaust gas rises. The characteristic variables which are possible as a function of load W and rotational speed U of the internal-combustion engine 14 are in this case divided into four regions which can be applied as desired. In this case, in a region 32 the need for desulfurization is selected in such a manner that it is substantially determined by the degree of sulfurization, i.e. the desulfurization is initiated when a predeterminable threshold value for the degree of sulfurization is reached. By contrast, in an region 34, the temperature of the $NO_x$ storage catalytic converter 16 is used in addition to the degree of sulfurization in order to assess the need for desulfurization. For example, the desulfurization may be initiated when 70% of the threshold value is reached and a temperature of, for example, more than 400° C. prevails. The term 100% of the threshold value is understood as meaning a degree of sulfurization whose accompanying $NO_x$ activity intervention still enables the statutory pollutant limits in the approval run to be met.

If the temperature rises to over 550° C., the desulfurization can be deemed necessary even when only 50% of the threshold value has been reached (region 36), while in region 38 both the lambda value and the temperature are such that, irrespective of the degree of sulfurization, they allow natural desulfurization of the $NO_x$ storage catalytic converter 16.

The control of the desulfurization process which is illustrated firstly allows increased fuel consumption caused by the need to heat the $NO_x$ storage catalytic converter 16 to the minimum temperature to be reduced, and secondly means that, as a result of the threshold value being reduced at higher temperatures, desulfurization is initiated earlier, so that the sulfate grain size which is present is smaller. Therefore, corrosive processes, for example cracking, are also reduced.

Instead of assessing the need for desulfurization in regions, as shown by way of example, it is also possible for this need to be assessed continuously on the basis of a decision matrix which compares an energy consumption required for desulfurization with the need for desulfurization. The energy consumption is dependent on the $NO_x$ storage catalytic converter temperature and the degree of sulfurization.

What is claimed is:

1. A process for the desulfurization of at least one $NO_x$ storage catalytic converter arranged in an exhaust pipe of an internal-combustion engine, comprising the steps of:

setting a minimum desulfurization temperature at the $NO_x$ storage catalytic converter and an operating mode of the internal-combustion engine with lambda$\leq 1$;

at least temporarily influencing one operating parameter of the internal combustion engine in order to reach at least one of the operating mode and the minimum temperature; and initiating the desulfurization
      as a function of a ratio of the $NO_x$ concentration upstream and downstream of the $NO_x$ storage catalytic converter as a function of an $NO_x$ mass a incorporated in the $NO_x$ storage catalytic converter (degree of sulfurization), and
      as a function of at least one of a current lambda value and a current temperature of the $NO_x$ storage catalytic converter.

2. The process as claimed in claim 1, wherein the need for desulfurization is assessed continuously or in a stepwise manner on the basis of the degree of sulfurization and at least one of the current lambda value and the current temperature of the $NO_x$ storage catalytic converter.

3. The process as claimed in claim 1, wherein the threshold value for the degree of sulfurization falls as the temperature of the $NO_x$ storage catalytic converter rises.

4. A process for the desulfurization of at least one $NO_x$ storage catalytic converter arranged in an exhaust pipe of an internal-combustion engine, comprising the steps of:

setting a minimum desulfurization temperature at the $NO_x$ storage catalytic converter and an operating mode of the internal-combustion engine with lambda<1;

at least temporarily influencing one operating parameter of the internal combustion engine in order to reach at least one of the operating mode and the minimum temperature;

initiating the desulfurization
      as a function of a ratio of the $NO_x$ concentration upstream and downstream of the $NO_x$ storage catalytic converter as a function of an $NO_x$ mass incorporated in the $NO_x$ storage catalytic converter (degree of sulfurization), and
      as a function of at least one of a current lambda value and a current temperature of the $NO_x$ storage catalytic converter;

wherein the need for desulfurization is assessed continuously or in a stepwise manner on the basis of the degree of sulfurization and at least one of the current lambda value and the current temperature of the $NO_x$ storage catalytic converter; and wherein a threshold value for the degree of sulfurization at which desulfurization is initiated is varied continuously or in a stepwise manner as a function of at least one of the current lambda value and the current temperature of the $NO_x$ storage catalytic converter.

5. The process as claimed in claim 4, wherein the threshold value for the degree of sulfurization falls as the temperature of the $NO_x$ storage catalytic converter rises.

* * * * *

UNITED STATES PATENT AND TRADEMARK OFFICE
CERTIFICATE OF CORRECTION

PATENT NO. : 6,637,190 B1
DATED : October 28, 2003
INVENTOR(S) : Ekkehard Pott

It is certified that error appears in the above-identified patent and that said Letters Patent is hereby corrected as shown below:

<u>Column 4,</u>
Line 19, after "mass" cancel "a".

Signed and Sealed this

Tenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,637,190 B1  
DATED : October 28, 2003  
INVENTOR(S) : Ekkehard Pott It is certified that error appears in the above-identified patent and that said Letters Patent is hereby corrected as shown below:

Column 4,  
Line 19, after "mass" cancel "a".  
Line 24, after "converter" cancel the "." and enter -- , wherein a threshold value for the degree of sulfurization at which desulfurization is initiated is varied continuously or in a stepwise manner as a function of at least one of the current lambda value and the current temperature of the $No_x$ storage catalytic converter. --.  
Line 38, "<1" should read -- $\leq 1$ --.

This certificate supersedes Certificate of Correction issued on Feb. 10, 2004.

Signed and Sealed this

Twentieth Day of July, 2004

JON W. DUDAS  
*Acting Director of the United States Patent and Trademark Office*